(12) United States Patent
Chami

(10) Patent No.: US 9,318,748 B2
(45) Date of Patent: Apr. 19, 2016

(54) BIPOLAR ELECTROCHEMICAL LI-ION BATTERY HAVING INCREASED CAPACITY

(75) Inventor: Marianne Chami, Fontaine (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 350 days.

(21) Appl. No.: 14/114,112

(22) PCT Filed: Apr. 25, 2012

(86) PCT No.: PCT/EP2012/057498
§ 371 (c)(1),
(2), (4) Date: Oct. 25, 2013

(87) PCT Pub. No.: WO2012/146589
PCT Pub. Date: Nov. 1, 2012

(65) Prior Publication Data
US 2014/0045040 A1    Feb. 13, 2014

(30) Foreign Application Priority Data

Apr. 26, 2011 (FR) .................... 11 53564

(51) Int. Cl.
*H01M 4/75* (2006.01)
*H01M 4/04* (2006.01)
*H01M 2/16* (2006.01)
*H01M 4/485* (2010.01)
*H01M 4/58* (2010.01)
*H01M 4/66* (2006.01)
(Continued)

(52) U.S. Cl.
CPC ............. *H01M 4/75* (2013.01); *H01M 2/1646* (2013.01); *H01M 2/1653* (2013.01); *H01M 4/0402* (2013.01); *H01M 4/485* (2013.01); *H01M 4/5825* (2013.01); *H01M 4/661* (2013.01); *H01M 10/0525* (2013.01); *H01M 10/0583* (2013.01); *Y02E 60/122* (2013.01); *Y02P 70/54* (2015.11); *Y10T 29/4911* (2015.01)

(58) Field of Classification Search
CPC ............ H01M 2/1646; H01M 2/1653; H01M 4/0402; H01M 4/485; H01M 4/5825; H01M 4/661; H01M 4/75; H01M 10/0525; H01M 10/0583; Y02E 60/122; Y02P 70/54; Y10T 29/1911

See application file for complete search history.

(56) References Cited

U.S. PATENT DOCUMENTS

| | | | |
|---|---|---|---|
| 4,029,855 | A | 6/1977 | Dougherty et al. |
| 5,595,839 | A | 1/1997 | Hossain |
| 6,909,711 | B1 | 6/2005 | Noguchi |

(Continued)

FOREIGN PATENT DOCUMENTS

| | | |
|---|---|---|
| FR | 1.050.230 | 1/1954 |
| JP | 2000-30746 A | 1/2000 |

(Continued)

OTHER PUBLICATIONS

U.S. Appl. No. 14/344,740, filed Mar. 13, 2014, Chami, et al.

(Continued)

*Primary Examiner* — Brittany Raymond
(74) *Attorney, Agent, or Firm* — Oblon, McClelland, Maier & Neustadt, L.L.P.

(57) ABSTRACT

A bipolar lithium-ion electrochemical battery having increased capacity.

16 Claims, 9 Drawing Sheets

(51) Int. Cl.
*H01M 10/0525* (2010.01)
*H01M 10/0583* (2010.01)

(56) References Cited

U.S. PATENT DOCUMENTS

| | | | |
|---|---|---|---|
| 7,097,937 | B2 | 8/2006 | Fredriksson et al. |
| 7,163,765 | B2 | 1/2007 | Hosaka et al. |
| 7,220,516 | B2 | 5/2007 | Oosawa et al. |
| 7,279,248 | B2 | 10/2007 | Fukuzawa et al. |
| 7,320,846 | B2 | 1/2008 | Watanabe et al. |
| 7,335,448 | B2 | 2/2008 | Kaito et al. |
| 7,338,733 | B2 | 3/2008 | Morita et al. |
| 7,348,098 | B2 | 3/2008 | Hayashi et al. |
| 2006/0121348 | A1 | 6/2006 | Mizutani et al. |
| 2007/0042264 | A1 | 2/2007 | Desilvestro et al. |
| 2007/0115047 | A1 | 5/2007 | D'Abramo et al. |
| 2008/0057392 | A1 | 3/2008 | Takamatsu et al. |
| 2008/0060189 | A1 | 3/2008 | Daidoji et al. |
| 2013/0029224 | A1 | 1/2013 | Fusalba et al. |
| 2013/0089774 | A1 | 4/2013 | Chami |
| 2013/0101903 | A1 | 4/2013 | Barchasz et al. |
| 2013/0108913 | A1 | 5/2013 | Barchasz et al. |
| 2013/0157111 | A1 | 6/2013 | Chami et al. |
| 2013/0157114 | A1 | 6/2013 | Barchasz et al. |

FOREIGN PATENT DOCUMENTS

| | | |
|---|---|---|
| JP | 2001-236946 | 8/2001 |
| JP | 3419311 B2 | 6/2003 |
| JP | 2009-135079 | 6/2009 |
| WO | WO 03/047021 A2 | 6/2003 |
| WO | WO 2006/061696 A2 | 6/2006 |
| WO | WO 2010/038312 A1 | 4/2010 |

OTHER PUBLICATIONS

French Preliminary Search Report issued Dec. 22, 2011 in Patent Application No. 1153564 with English Translation of Category of Cited Documents.
International Search Report Issued Aug. 13, 2012 in PCT/EP12/057498 filed Apr. 25, 2012.
Office Action mailed Jan. 4, 2016, in Japanese Patent Application No. 2014-506834 (with English-language translation).

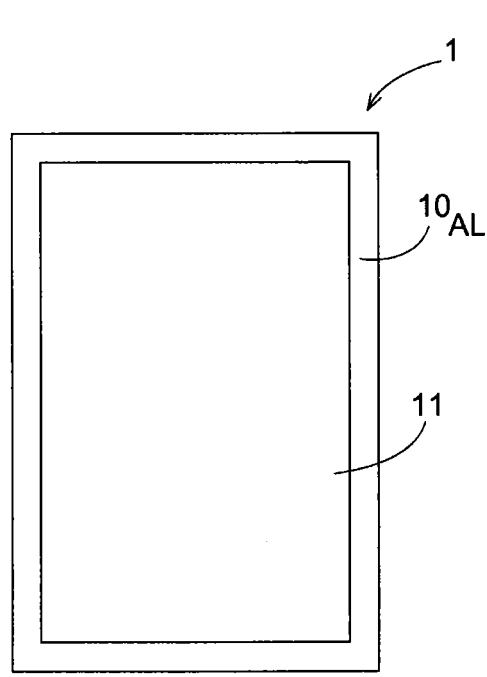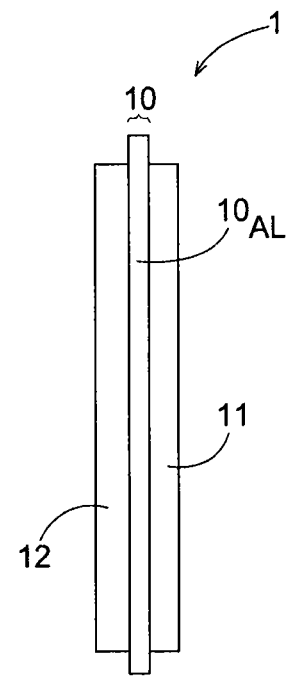
FIG.3A  FIG.3B
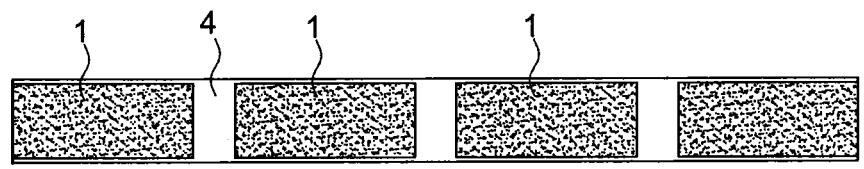
FIG. 4A

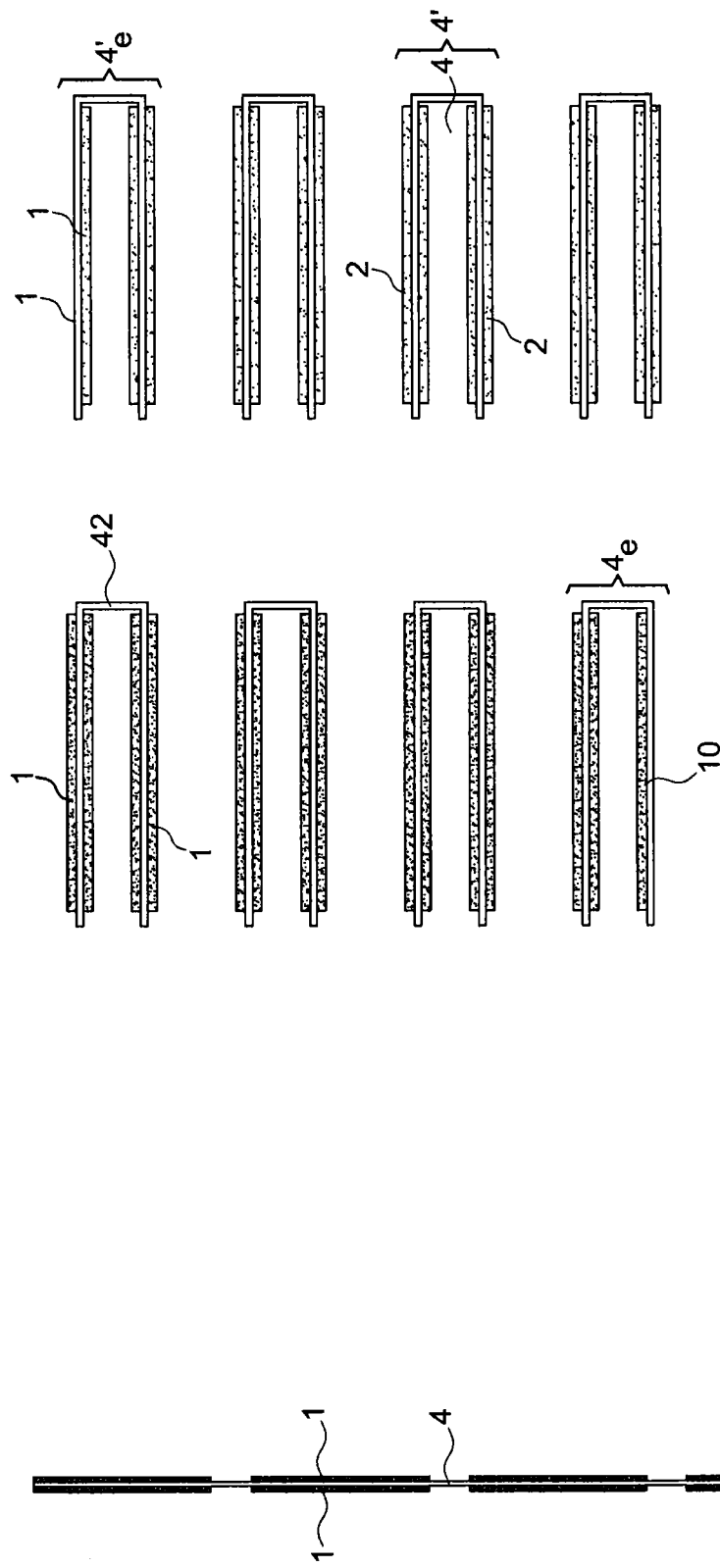

BIPOLAR ELECTROCHEMICAL LI-ION BATTERY HAVING INCREASED CAPACITY

FIELD OF THE INVENTION

The present invention relates to the field of lithium electrochemical generators, operating based on the lithium insertion or deinsertion principle in at least one electrode.

It relates more particularly to a bipolar Lithium-ion (or Li-ion) battery comprising at least one bipolar function current collector.

Usually, in such a battery, the structure is referred to as bipolar as the collector or electrode referred to as bipolar denotes an electrically conductive substrate comprising two opposite faces, on one whereof an active layer of positive electrode material is deposited and on the other whereof an active layer of negative electrode material is deposited.

The aim of the invention is that of increasing the capacity (in Ampere-hours or Ah) of a bipolar Li-ion battery or a bipolar Li-ion battery consisting of the assembly of bipolar Li-ion batteries.

PRIOR ART

The structure of conventional Li-ion batteries is a structure that can be described as monopolar, since it has a single electrochemical cell comprising an anode, a cathode and an electrolyte. A plurality of types of monopolar structure geometry are known:

- a cylindrical geometry as disclosed in the patent application US 2006/0121348,
- a prismatic geometry as disclosed in the U.S. Pat. Nos. 7,348,098, 7,338,733;
- a stack geometry as disclosed in the patent applications US 2008/060189, US 2008/0057392, and U.S. Pat. No. 7,335,448.

A monopolar structure is produced by winding. The winding consists of a current collector whereon a positive electrode material (cathode) is continuously deposited, with a separator made of polymeric or ceramic material inserted on a negative electrode material (anode) in turn deposited on another current collector. The primary advantage of this monopolar structure is that of having a large active surface area of the material, but the difference in potential is restricted to the unitary value of the difference in potential between the two electrode materials used, which is also the case of the stack geometry.

The energy (in Watt-hours or Wh) of a Li-ion cell is proportional both to the voltage thereof (in Volts or V) and to the capacity thereof.

The voltage of a cell generally corresponds to that of the electrochemical anode/cathode pair forming same. Typically, for a $Li_4Ti_5O_{12}$ anode and $LiFePO_4$ cathode pair, the nominal voltage is 1.88V.

The capacity of a cell is dependent on the surface area and the thickness of the electrodes used. In this way, to increase the capacity of a cell, it is standard to increase the mass per unit area of the electrodes and/or the surface area of the electrodes. An excessive increase in the mass per unit area of the electrodes cannot be envisaged for a so-called "power" application in cell operation.

Moreover, this is the parameter adopted by Li-ion battery manufacturers to characterise same:

those referred to as "power" comprising Li-ion cells with electrodes having a low mass per unit area, typically less than 1 $mAh/cm^2$. The energy required for the target power application is supplied in this case by large electrode surface areas frequently produced by winding (prismatic or cylindrical winding);

those referred to as "energy" comprising Li-ion cells with electrodes having a high mass per unit area, typically greater than or equal to 1 $mAh/cm^2$. The energy required for the target energy application may also be increased by means of large electrode surface areas which may be produced by winding (prismatic or cylindrical winding).

In order to increase the mean potential of a monopolar Li-ion battery (cell) while retaining a comparable energy density, producing a battery with a plurality of electrochemical cells in series in known. The structure of the battery is thus described as bipolar since it comprises an electrode from one cell and an electrode from an adjacent cell mounted on the same current collector in the form of a sheet, referred to as a bipolar electrode. The structure of a bipolar battery thus consists of the serial connection of a plurality of monopolar batteries via bipolar electrodes or current collectors, with however the advantage of having a lower resistance relative to monopolar batteries connected in series via external connectors.

In this case, mention may be made of a plurality of patent applications or patents relating to such bipolar batteries, such as U.S. Pat. Nos. 7,279,248, 7,220,516, 7,320,846, and 7,163,765, WO 03/047021, WO 2006/061696, U.S. Pat. No. 7,097,937. In all these bipolar batteries, the bipolar current collector bears, on one face, a positive electrode from one cell and, on the other opposite face, a negative electrode from an adjacent cell.

The bipolar structures generally used are of the stack type. A bipolar Li-ion battery according to the prior art in shown in FIG. 1, as illustrated in the patent application WO 03/047021.

This battery comprises at the top a conductive substrate made of aluminium 13 (positive end current collector) and an active layer 14 based on positive lithium insertion material, such as $Li_{1.04}Mn_{1.96}O_4$ and at the bottom a conductive part made of aluminium 21 (negative end current collector) and an active layer 20 based on positive lithium insertion material, such as $Li_4Ti_5O_{12}$.

In this battery, a bipolar electrode 1, also referred to as a bipolar current collector, comprises a positive active layer 18 and a negative active layer 19 on either side of a conductive substrate made of aluminium 17 in sheet form.

The lower 20 and upper electrodes 14 are separated from the bipolar electrode 1 by two separators 15, 19 wherein an electrolyte is found in liquid or gel form. The electrolyte tightness of the battery between the two adjacent electrochemical cells formed 14, 15, 16 and 18, 19, 20 is ensured by a seal 22 produced by depositing resin or adhesive on the periphery of all the electrodes and the sheet 17.

A bipolar current collector 10 or 17 according to the prior art is, according to the lithium ion insertion materials used for producing the electrodes:

either consisting of two overlaid sheets, of which one typically made of aluminium 10AL is coated with a cathode 11 and the other typically made of copper 10C is coated with an anode 12 (FIGS. 2A and 2B), or consisting of a single sheet typically made of aluminium 10AL coated on one of the faces thereof with a cathode 11 and on the other of the faces thereof by an anode 12 (FIGS. 3A and 3B).

The overall voltage of a bipolar battery may be readily increased by stacking a greater number of electrochemical compartments. The primary drawback of a stack having a greater number of compartments is that this may give rise to failure of the bipolar battery. Indeed, stacking requires the use of tightening means on either side to create a satisfactory mechanical contact on the entire surface area of the elements in relation to each other, i.e. ensure satisfactory contact of the electrolyte with the positive, negative electrodes and the separator to obtain satisfactory operation of each of the cells.

Such tightening means are for example described in the U.S. Pat. No. 5,595,839.

In other words, to increase the energy of bipolar Li-ion batteries further, it would be necessary to increase the capacity thereof.

For this purpose, some patents, such as JP 3419311 B2, mention the appealing idea of being able to wind a bipolar cell. However, in practice, this prospect remains difficult to carry out by the very design of the bipolar cells. Indeed, as described for the structure according to the prior art (FIG. 1), the embodiment of bipolar cells implies the arrangement at the periphery of the bipolar collector, or the electrodes, of an uncoated frame whereon a resin or adhesive is deposited to form a seal which is tight in relation to the liquid electrolyte. This arrangement reduces the flexibility of the bipolar cell very considerably and, in concrete terms, prevents winding of the electrodes.

Furthermore, the applicant proposed, in the patient application filed under the No. FR 10 50230, a further solution consisting of connecting "energy" type elements (electrodes with a high mass per unit area) and "power" type elements (electrodes with a low mass per unit area) in series or parallel.

The aim of the invention is thus that of proposing a novel solution for increasing the capacity of bipolar Li-ion (battery) cells.

DESCRIPTION OF THE INVENTION

For this, the invention relates to a bipolar Li-ion electrochemical battery, comprising at least two electrochemical compartments arranged adjacent to each other while being electrically connected in series, each of the compartments comprising:

- at least one first electrically conductive substrate acting as the current collector comprising two faces, wherein a first face supports an electrode according to at least one pattern and the second face supports an electrode according to two patterns at a mutual distance defining an area devoid of patterns, wherein one of the two patterns of the second face is supported in the same area as the pattern of the first face and the first substrate is bent at the area devoid of patterns so as to obtain a U shape with one pattern from the first face opposite one pattern from the second face;
- at least one second electrically conductive substrate acting as the current collector comprising two faces, wherein a first face supports an electrode according to at least one pattern and the second face supports an electrode according to two patterns at a mutual distance defining an area devoid of patterns, wherein one of the two patterns of the second face is supported in the same area as the pattern of the first face and the second substrate is bent at the area devoid of patterns so as to obtain a U shape with one pattern from the first face opposite one pattern from the second face,
- an electrically insulating separator impregnated with an electrolyte and bent according to an accordion shape nested in each of the U shapes of the first and second substrates which are in turn nested in each other, such that said separator impregnated with electrolyte is in contact with each of the electrode patterns.

For each of the compartments:
- at least one of the first and second substrates forming the end substrates has a face with precisely one electrode pattern and the electrode patterns of the same substrate have the same polarity;
- the electrode patterns of the second substrate have the opposite polarity of those of the electrode of the first substrate.

All the first or second substrates of one of the compartments are in continuous electrical contact with material continuity with all the second or first substrates of another of the adjacent compartments respectively, via the areas thereof devoid of electrode forming the base of the U shapes; wherein the electrode patterns of the substrates of one compartment, in continuous electrical contact, have the opposite polarity of those of the substrates of the other adjacent compartment, in continuous electric contact, thus defining a bipolar current collector.

The battery according to the invention further comprises an electrically insulating seal arranged on each peripheral edge of each compartment not coated with a substrate or with the continuous electrical contact area with material continuity between substrates, so as to seal the electrolytes and isolate the compartments from the ambient air.

The solution according to the invention is suitable for increasing the capacity of a bipolar Li-ion battery while ensuring satisfactory power operation since the mass per unit area of the electrodes can remain low.

Unlike the solutions according to the prior art, whereby bipolar current collectors are produced by coating (depositing) electrode patterns of opposite polarity on either side of the same substrate to form a current collector or bipolar collector, the solution according to the invention essentially consists of:

- firstly producing current collector substrates supporting electrode patterns of the same polarity,
- bending said substrates to increase the capacity of the electrochemical compartments while limiting the size thereof (the height of the electrochemical compartments being limited in any case by the thinness of the substrates, electrode patterns and separator containing the electrolyte);
- and continuously connecting in series two electrolytic compartments with material continuity via the collectors thereof each supporting electrode patterns of opposite polarity, the connection in series producing bipolar current collectors.

In other words, in this case, according to the invention, bipolar current collectors are produced, defining two separate and mutually adjacent electrolytic compartments with increased active electrode surface areas due to the suitable bending of the two substrates.

The solution according to the invention makes it possible to do away with pressure/back-pressure problems between the adjacent electrolytic compartments in bipolar stack structures according to the prior art.

According to the invention, when producing a compartment, care is taken to apply a sufficient compression force to apply the positive and negative electrode patterns and separator/electrolyte against each other.

The electrically insulating seal may consist of a resin or an adhesive. It may consist of an elastomer from the ethylene-propylene family such as EPDM, or the styrene-butadiene such as latex or the silicone family or the thermoplastic elastomer (TPE) family, of the styrene type such as SBS° or Kapton®.

The battery according to the invention may comprise a flexible container or a rigid housing to contain the compartments tightly.

In this way, according to a first embodiment, the battery may comprise:

- two end current collectors each consisting of a strip, including one connected to the face of an end substrate of one compartment adjacent with one other compartment and comprising a single electrode pattern and the other to the face of an end substrate of the other compartment adjacent with one other compartment and comprising a single electrode pattern, wherein the electrode patterns connected to one of the two strips have the opposite polarity to those of the electrode connected to the other strip;
- a flexible container arranged to contain the compartments tightly while being traversed by a portion of the strips acting as a battery charge pole.

For the flexible container, those currently commercially available may be used, the electrochemical compartments according to the invention being previously insulated from the ambient air before positioning the container. Such standard flexible containers may be manufactured from a multilayer composite material consisting typically of a stack of aluminium layers coated with a polymer. In most cases, the polymer coating the aluminium is chosen from polyethylene (PE), propylene, polyamide (PA) or may be the form of an adhesive layer consisting of polyester-polyurethane. Typically, the companies Showa Denko and DNP sell this type of composite materials for use as a battery container. For example, a flexible container manufactured from a stack of aluminium layers is supplied by Showa Denko under the references No. ADR-ON25/AL40/CPP40 or No. ADR-ON25/AL40/CPP80.

According to a second embodiment characterised from the first embodiment, the battery may comprise:

- two end current collectors each consisting of a strip, including one connected to the face of an end substrate of one compartment adjacent with one other compartment and comprising a single electrode pattern and the other to the face of the end substrate of the other compartment adjacent with one other compartment and comprising a single electrode pattern, wherein the electrode patterns connected to one of the two strips have the opposite polarity to those of the electrode connected to the other strip;
- an electrically insulating film coating the free faces of each compartment while being traversed by a portion of the strips;
- a rigid metallic container acting as a housing arranged to contain the compartments coated by the electrically insulating film(s), wherein the strips are each connected to a contact protruding from the metallic housing each acting as one of the battery charge poles and one of the poles is electrically insulated from the metallic housing by a further electrically insulating seal arranged in an annular manner relative to said contact.

The electrically insulating film may consist for example of an electrically insulating flexible polymer such as PTFE, PVDF, silicone polyimide, polyurethane, parylene or PET.

The metallic housing may consist of an aluminium or stainless steel housing.

Each substrate acting as a current collector may be a metallic strip or grid with at least one face covered with a metallic strip. In this way, when the electrode patterns are produced on a grid, the metallic strip coating same and welded thereon ensures tightness in respect of the liquid electrolyte of one electrical compartment to that (those) adjacent. Each substrate acting as a current collector may be made of aluminium or copper.

Preferably, all the compartments are identical with each other.

Each separator may be a microporous film, such as polyolefin, ceramics or PVDF type polymer. In any case, a separator of a thickness and materials such that it can be readily bent into an accordion shape and remains bent to carry out the nesting thereof with the current collector substrates bent into a U shape.

Advantageously, all the negative lithium insertion material-based electrode patterns are based on $Li_4Ti_5O_{12}$ and all the positive lithium insertion material-based electrode patterns are based on $LiFePO_4$. Such an electrochemical pair of $Li_4Ti_5O_{12}/LiFePO_4$ offering a potential of 1.88 Volt particularly offers the advantage of high stability during safety tests and high charge/discharge mode performances.

Each electrolyte is preferably a carbonated electrolyte containing a lithium salt, such as $LiPF_6$.

The invention also relates to a method for producing a bipolar Li-ion electrochemical battery comprising at least two electrochemical compartments arranged adjacent to each other while electrically connected in series, whereby the following steps are carried out:

A/ for each electrochemical compartment, steps a/ to f/ hereinafter at least once:

a/ depositing, on a first face of an electrically conductive substrate acting as the current collector, at least one electrode pattern and, on a second face of the first substrate opposite the first face, two electrode patterns having the same sign as the electrode pattern of the first face, wherein the two patterns are at a mutual distance defining an area devoid of patterns and one of the two patterns of the second face is deposited in the same area as the pattern of the first face;

b/ bending the first electrically conductive substrate so as to shape same substantially in a U shape;

c/ implementing steps a/ and b/ with a second electrically conductive substrate acting as a current collector and depositing three electrode patterns having the opposite polarity to those deposited on the first substrate; the dimensions of the first and second substrates after bending being substantially equal to each other;

d/ bending an electrically insulating separator so as to shape same substantially into an accordion shape, e/ nesting the separator after bending into the first and second substrates, each after bending and nesting in each other such that the accordion-shaped separator fits closely to each electrode pattern and the peripheral edges of the substrates;

f/ producing seals on the peripheral edges of the end substrates of the compartment and on one of the peripheral edges of the substrates not surrounded by the bent substrates, wherein step f/ is carried out once the separator has been impregnated with an electrolyte.

B/ providing continuous electrical contact with material continuity of all the first or second substrates of one of the compartments with all the second or first of the substrates of another adjacent compartment respectively via the areas thereof devoid of patterns forming the base of the U shapes, wherein the electrode patterns of the substrates of one compartment, in continuous electrical contact, have the opposite polarity of those of the substrates of the other adjacent compartment, in continuous electric contact, thus defining a bipolar current collector.

The method according to the invention is suitable for obtaining a high-capacity bipolar Li-ion battery by means of techniques for bending current collectors with electrode patterns and separators containing the electrolyte which are easy to implement.

Preferably, a separator is impregnated with the electrolyte before performing the step A-f/.

The steps for depositing active layers of the electrode patterns on the electrically conductive substrate may be performed by means of coating. Preferably, the coating technique used in the "slot die" method: it enables control along the orthogonal direction relative to the surface of the position of the coating head not in contact with the substrate resulting in the definition of the deposition patterns and the areas devoid of deposition patterns. Such a method is particularly advantageous in the context of the invention since it enables the continuous production of alternating active layer patterns having the same polarity on the same face of the substrate.

Step B/ for providing the continuous electrical contact may be carried out advantageously:
either by electric welding or by laser welding;
or by means of a metal cladding technique between current collector substrates.

Step B/ may be carried out using an intermediate metallic sheet between the two current collector substrates placed in continuous electrical contact.

BRIEF DESCRIPTION OF THE FIGURES

Further advantages and features of the invention will emerge on reading the description given as an illustration with reference to the following figures wherein:

FIGS. 3A and 3B are front and sectional views respectively of a further bipolar current collector used in a bipolar lithium battery according to the prior art, FIGS. 4A and 4B are top and side views respectively of a current collector according to the invention;

FIGS. 6A to 6F are side views showing the various steps for producing a further bipolar battery according to the invention;

DETAILED DESCRIPTION OF PARTICULAR EMBODIMENTS

FIGS. 1 to 3B relate to a bipolar battery according to the prior art and have already been described in the preamble. They are no longer described in detail hereinafter.

Figure 1:
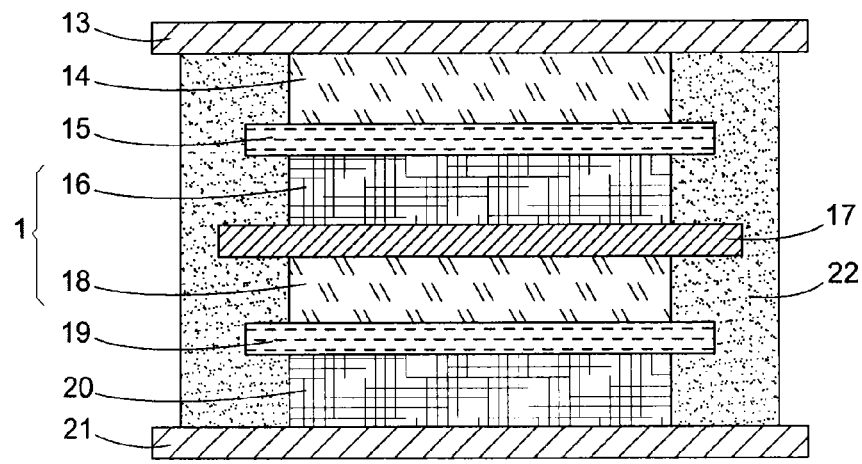
FIG. 1 is a schematic longitudinal sectional view of a bipolar lithium battery according to the prior art.
Figures 2A, 2B:
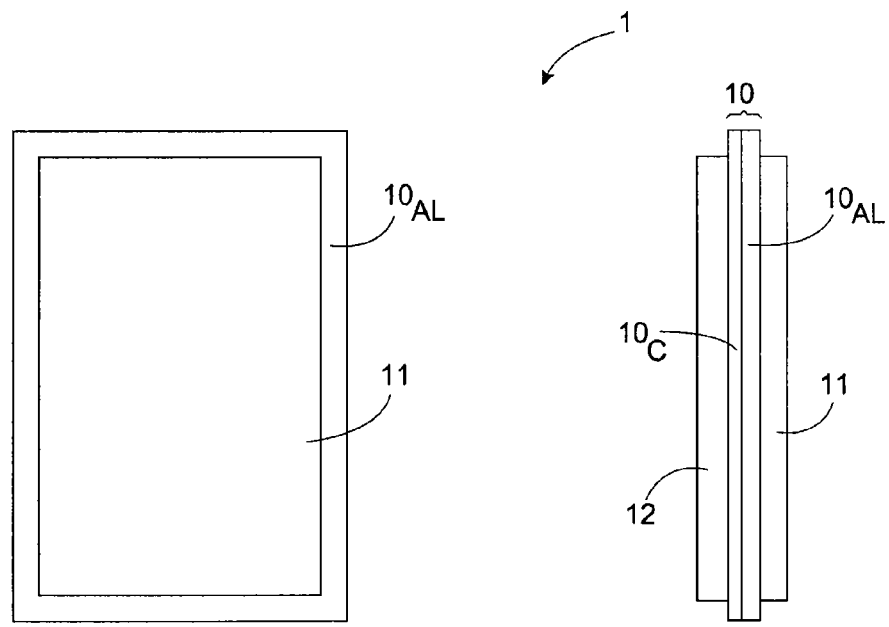
FIGS. 2A and 2B are front and sectional views respectively of a bipolar current collector used in a bipolar lithium battery according to the prior art.
Figure 4B:
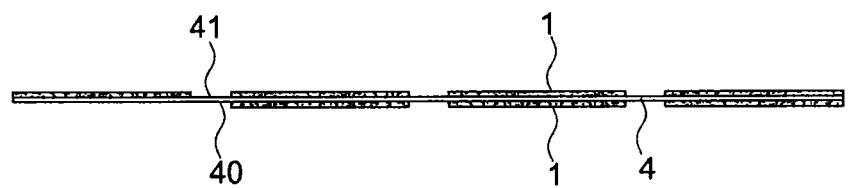
Figure 4C:
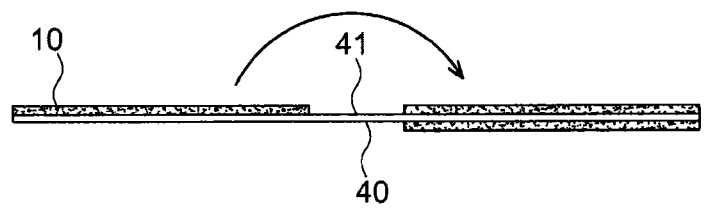
FIGS. 4C to 4F are side views showing schematically the various steps for producing an electrochemical compartment according to the invention.
Figure 4D:
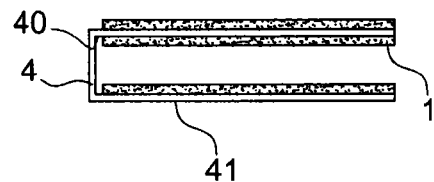
Figure 4E:
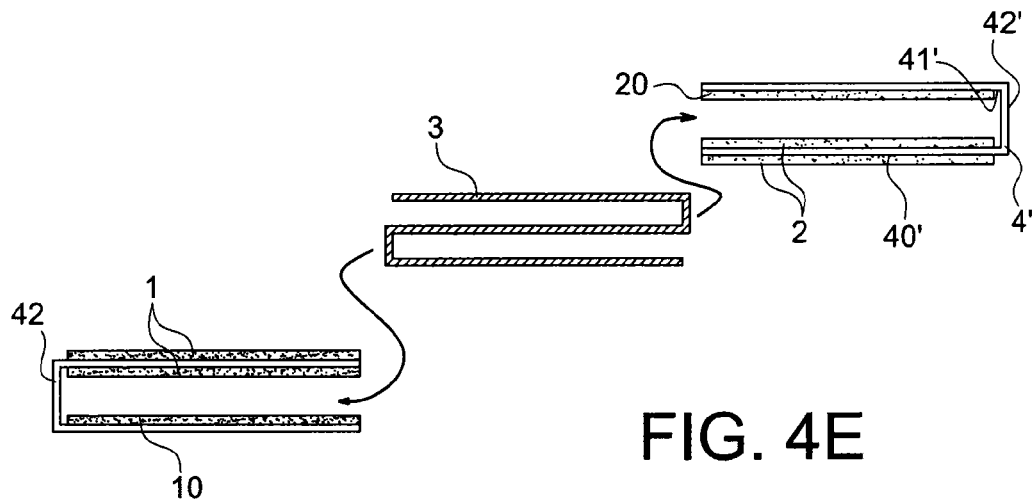
Figure 4F:
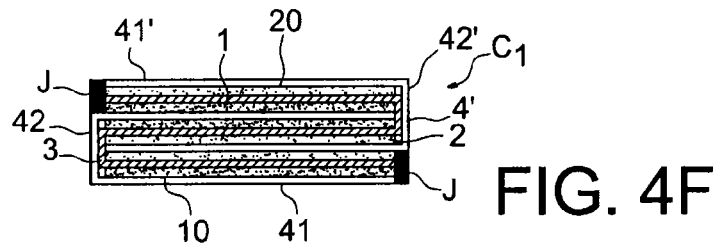

A Lithium-ion electrochemical compartment C1 according to the invention is shown in FIG. 4F.

Figure 5:
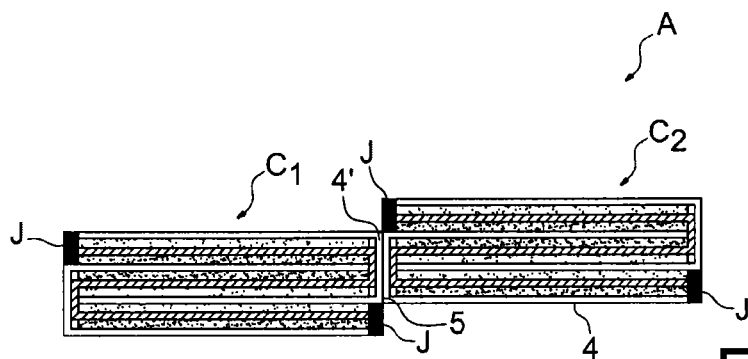
FIGS. 5 and 5A are side views showing two bipolar Li-ion batteries according to the invention produced using two and four electrochemical compartments according to FIG. 4F respectively.

A bipolar Lithium-ion electrochemical battery A according to the invention comprising two identical electrochemical compartments C1, C2, adjacent with each other and electrically connected in series is represented in FIG. 5.

Figure 5A:
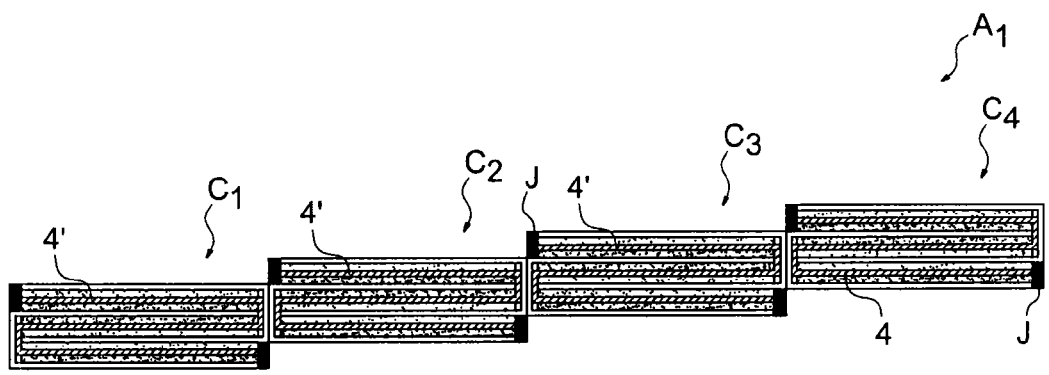

A further bipolar Lithium-ion electrochemical battery A1 comprising four identical electrochemical compartments C1 to C4 adjacent with each other and electrically connected in series is represented in FIG. 5A.

Each of these electrochemical compartments C1 to C4 firstly comprises a first electrically conductive substrate 4 acting as a current collector comprising two faces 40, 41.

On one of the faces 41, a positive electrode is deposited in a single pattern 1.

On the other face 41, a positive electrode is deposited in two patterns 1, 10 at a mutual distance defining an area 42 devoid of patterns. One of the two patterns 1 of the second face 41 is deposited in the same area as the pattern 40. As seen in FIG. 4F, the first substrate 4 is bent at the area 42 devoid of patterns so as to obtain a U shape with one pattern 1 from the first face opposite one pattern 1 from the second face.

Each of these electrochemical compartments C1 to C4 also comprises a second electrically conductive substrate 4' acting as the current collector comprising two faces 40', 41'. The second electrically conductive substrate 4 is similar to the electrically conductive substrate 4 described above, but it comprises negative electrode patterns 2, 20, i.e. having the opposite polarity to those of the first substrate 4. After bending, the first 4 and second 4' electrically conductive substrates have substantially identical sizes and shapes.

In this way, a first 4 and a second substrate 4' acting as a current collector according to the invention each supports electrode patterns of the same polarity, i.e. positive and negative, respectively.

Finally, each of the compartments C1 to C4 comprises an electrically insulating separator 3 impregnated with an electrolyte and bent according to an accordion shape nested in each of the U shapes of the first 4 and second 4' substrates which are in turn nested in each other, such that said separator impregnated with electrolyte is in contact with each of the electrode patterns 1, 10; 2, 20.

In this case, for each of the compartments C1 to C4, the first 4 and second 4' substrates form the end substrates and each has a face 41, 41' with precisely a single electrode pattern 1.

As seen in FIG. 5, the substrate 4 of the compartment C1 is in continuous electrical contact with material continuity with the substrate 4' of the other adjacent compartment C2, via the areas 42, 42' thereof devoid of patterns forming the base of the U shapes.

In this way, the negative electrode patterns 2, 20 of the substrate 4' of the compartment C1 in continuous electrical contact have the opposite polarity of those of the positive electrode 1, 10 of the substrate 4 of the compartment C2 adjacent to C1 and thus define a bipolar current collector.

As seen in FIG. 5A, similarly, three bipolar current collectors are defined each between two mutually adjacent compartments C1-C2; C2-C3, C3-C4.

Finally, the battery according to the invention A or A1 further comprises an electrically insulating seal J arranged on each peripheral edge of each compartment C1 to C4 not coated with a substrate 4, 4' or via the area of continuous electrical contact with material continuity between substrates, so as to seal the electrolytes and isolate the compartments from the ambient air.

To produce this battery A or A1, the following procedure was applied according to the invention:
Step 1: The positive (cathodes) 1 and negative electrodes (anodes) 2 are produced separately in patterns 1, 10 or 2, 20 having the same polarity on each of the faces 40, 41 of a current collector 4 or 4'.

The patterns may be produced using various printing methods (for example: screen-printing, heliography, "slot-die" coating, etc.). The substrate 4 or 4' acting as the current collector is identical in this case regardless of the polarity of the deposited layers. This may be an aluminium strip A1 or a grid covered with an aluminium strip. For the electrode pattern 10 or 20 acting as the end electrode, single-sided coating is preferentially carried out. The electrode patterns 1, 2 are hot-rolled to obtain the sought porosity (between 30 and 50%, typically 40% for optimum power operation).

This step 1 is shown more specifically in FIGS. 4A and 4B for the production of the collector 4 with positive electrode patterns 1, 10. The same step is carried out for producing the collector 4' with electrode patterns 2, 20

Step 2: A current collector 4 with on the two faces 40, 41 thereof an electrode pattern 1 or 2 of the same sign and at a distance on one of the faces 40 or 41 thereof a further end electrode pattern having the same sign 10 or 20 is cut and then bent so that it can be welded on the bend 42.

This cutting and bending step 2 is shown in FIG. 4C and FIG. 4D for the collector 4 with positive electrode patterns 1, 10, respectively.

Step 3: The separator 3 bent into an accordion shape, a substrate 4 bent into a U shape with the positive electrode patterns 1, 10 thereof and the other substrate 4' bent into a U shape with the negative electrode patterns 2, 20 thereof is nested together so as to form an electrochemical compartment C1 (FIG. 4 E). In this way, a cathode pattern 1, 10 and an anode pattern 2, 20 of the compartment C1 are opposite each other, separated by the separator 3.

The accordion shape of the latter fits closely to one of the peripheral edges of the current collector 4' supporting three anode patterns 2, 20 and one of the peripheral edges of the current collector 4 supporting two cathodes 1. The base 42, 42' of the U shape of the substrates 4, 4' also fits closely to the accordion shape of the separator 3 but on the outside. The bases 42, 42' of the U shape (or bend) of the collectors 4, 4' thus each form an electrolyte-tight seal for all the peripheral edges of compartments C1 to C4 against which they fit closely.

Moreover, a seal J made of electrically insulating material is arranged on each peripheral edge of the compartment C1 not coated with one of the substrates 4, 4' so as to seal the electrolyte and isolate the compartment from the ambient air.

The electrolytic compartment C1 shown in FIG. 4F is finally obtained.

In respect of the activation of the compartment, the separator 3 and the electrode patterns 1,10; 2, 20 may be pre-impregnated or gelled or liquid electrolyte may be injected via syringes before sealing the compartment at the points where the seals J are produced.

Step 4: To obtain a battery A, A1 with at least two identical electrochemical compartments C1 to C4 electrically connected in series, the following procedure is applied. Electrical contact of two identical electrochemical adjacent compartments C1-C2, C2-C3, C3-C4 is created once the substrates 4 supporting the positive electrode patterns (cathode) 1, of a compartment will touch the substrates 4' supporting the negative electrode patterns 2, 20 of another compartment adjacent thereto. In fact, the aim is to create material continuity between substrates 4, 4' of two adjacent compartments.

At this stage, the adjacent compartments C1-C2, C2-C3, C3-C4 are connected in series via the same current collector 4, 4' thus forming a bipolar current collector.

To minimise the contact resistance between the two contiguous compartments C1-C2, C2-C3, C3-C4, it is more advantageous to use welding techniques 5. The latter may be electric, with the addition of a conductive material, laser or involve rolling cladding.

A battery A obtained according the invention thus consisting of two electrochemical compartments C1 and C2 is thus shown in FIG. 5.

The current collector 4 or 4' of the electrodes 1, 10 or 2, 10 may be porous. In this case, it is envisaged to weld same to an intermediate aluminium strip ensuring tightness between two adjacent electrochemical compartments. The bipolar electrodes according to the invention are thus produced in pairs by welding the collectors 4, 4'.

The voltage of a battery according to the invention may be increased by increasing the number of adjacent compartments electrically connected in series placed in continuous contact and produced according to the same manufacturing steps 1 to 4 described above. It is also possible to produce a battery A1 with four identical electrochemical compartments C1 to C4 (FIG. 5A).

In this example of an embodiment, the electrodes 1, 2 are produced in the form of patterns (for example 30 cm×30 cm squares, i.e. having a unit surface area of 900 cm$^2$, according to a dry electrode ink mass per unit area of 1 mAh/cm$^2$).

The electrically conductive substrate 4 or 4' for the positive electrodes 1, 10 and the negative electrodes 2, 20 is advantageously made of aluminium.

The positive electrode patterns 1, 10 may advantageously consist of an active layer based on positive lithium insertion materials, such as $Li_{1.04}Mn_{1.96}O_4$ or $LiFePO_4$.

The negative electrode patterns 2, 20 may advantageously consist of an active layer based on negative lithium insertion materials, such as $Li_4Ti_5O_{12}$.

Preferably, the active layers based on positive or negative insertion materials are deposited by coating a metallic substrate with an electrode ink comprising the active material, an electronic conductor and polymer, typically Polyvinylidene fluoride (PVdF), when the electrodes are produced by means of an organic process. The polymer is dissolved in a solvent which is generally N-methyl Pyrollidone. After evaporation thereof, the polymer perfectly dispersed with the powders, enables the adhesion of the active material and electronic conductor particles together and onto the current collector 4.

To optimise the power operation of a battery according to the invention, it is preferable to compress the electrode patterns 1, 10, 2, 20, on the conductive substrate 4 or 4' to optimise the porosity thereof. Indeed, the porosity should be sufficiently high to enable the wettability of the electrode and optimise the ion diffusion during battery cycling. It should also be sufficiently low to enhance the contact of the material particles together (active materials and electronic conductor) and optimise electrical conduction in the electrode to the current collector. Preferably, a porosity of the electrode patterns 1, 10; 2, 20 in the region of 40% is chosen for satisfactory power electrode operation. To be able to achieve such a porosity, hot rolling (80° C.) is preferably performed on either side of the electrode patterns 1, 10 or 2, 20. In this way, a reduction in the thickness of the electrodes and, as such, the porosity thereof is obtained.

In the case of step 3/for nesting the substrates 4, 4' after bending with the separator 3, the choice may be made to first nest the separator 3 in the substrate 4' supporting the negative electrode patterns 2, 20. In other words, the separator 3 is then arranged in contact with the surface of the negative electrode patterns 2 or 20. It is obvious that the same operation can be performed with the substrate 4 supporting the positive electrode patterns 1 or 10.

In a battery A, A1 according to the invention, the separator 3 bent into an accordion shape provides the electrical insulation between the positive electrode pattern 1, 10 and a negative electrode pattern 2 of each electrochemical compartment C1-C4. Preferably, the separator 3 is a microporous film, such as polyolefin, ceramic or PVdF. A PVdF film is routinely impregnated with a carbonated electrolyte, containing a lithium salt, for example the salt $LiPF_6$. Pre-activating (gelling the separator 3) may also be envisaged.

In the context of the invention, the number of substrates 4, 4' for the same battery, and the surface area and the number of bends of the supported electrode patterns 1, 10 or 2, 20 may be increased to increase the available voltage.

FIGS. 6A to 6F show the steps for producing a battery A2 according to the invention consisting of two identical adjacent electrochemical compartments C5, C6 electrically connected in series as above, but in this case each of the two compartments C5, C6 consists of a number of four substrates 4 supporting positive electrode patterns 1, 10 and four substrates 4' supporting negative electrode patterns 2, 20.

Figure 6C:
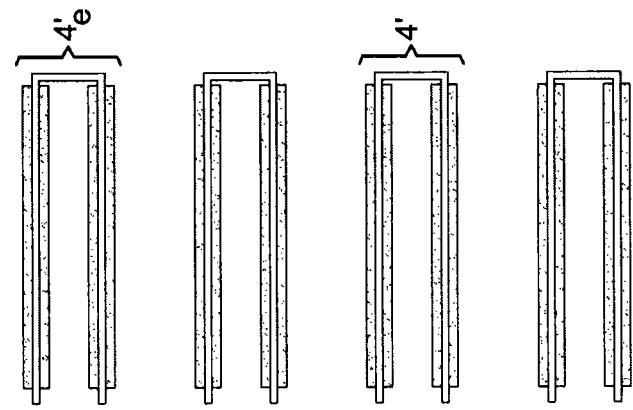
Figure 6C:
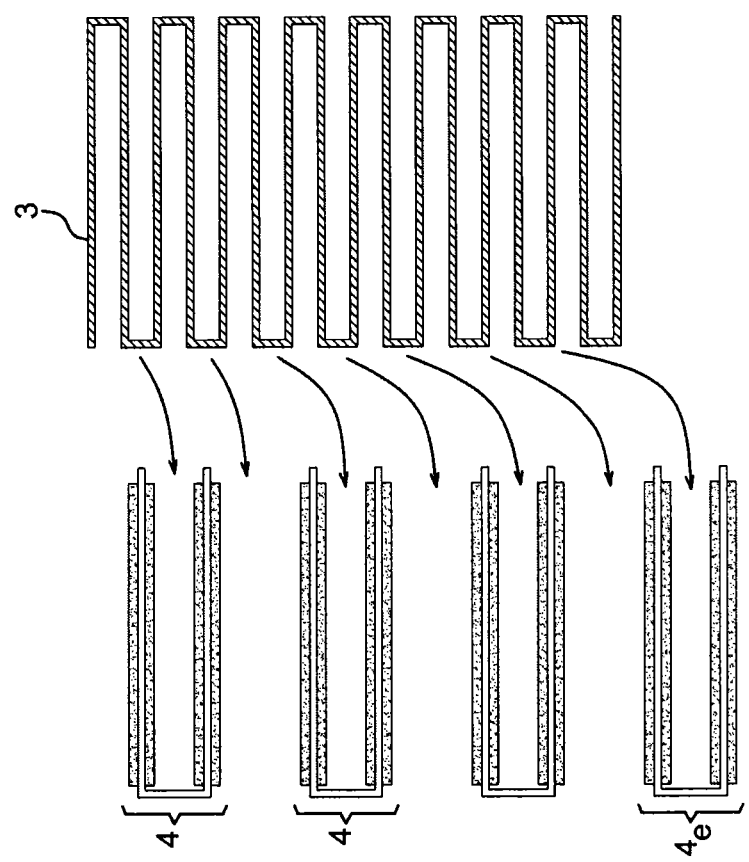
Figure 6D:
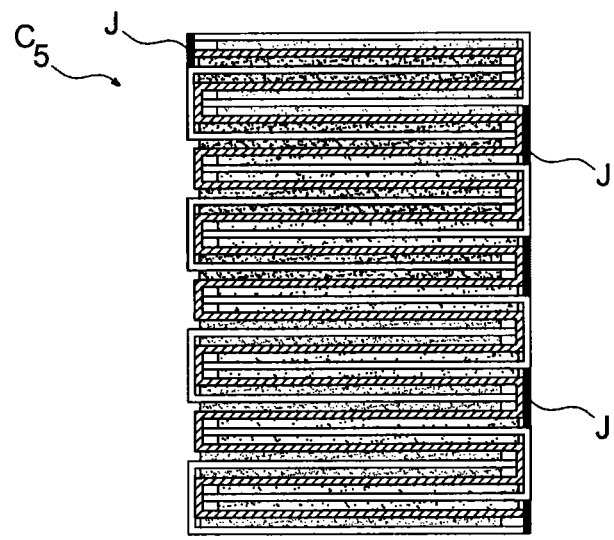
Figure 6E:
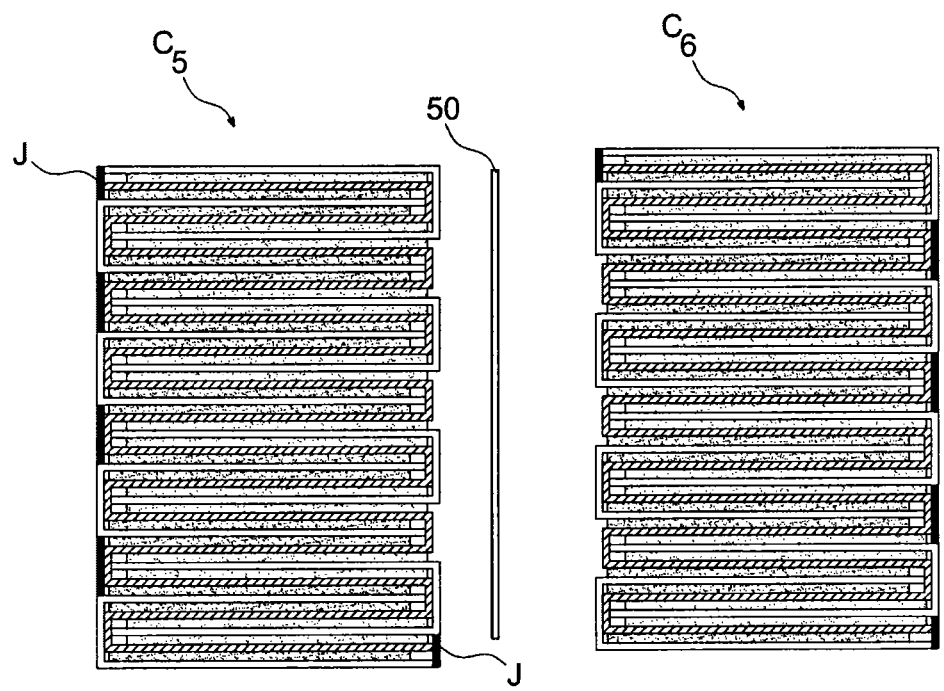

The production steps are equivalent to those carried out for the batteries A, A2 according to FIGS. 4A to 5A with successively:

- a step for producing and cutting the current collector substrates 4, 4', comprising on each of the faces 40, 41 or 40', 41' thereof two electrode patterns 1 or 2 of the same sign and mutually separated by an area devoid of patterns, with the exception of the end substrate 4e, 4'e comprising the end electrode pattern 10 or 20 (FIGS. 6A-6B). In other words, in this case, compared to the batteries A, A1 according to FIGS. 4A to 5A, in this case, the substrates 4, 4' cut to be arranged in each compartment C5, C6 each support two electrode patterns 1 or 2 on each face 40, 41 or 40', 41' thereof. In other words again, bent into a U shape, each face 40, 41 or 40', 41' of one arm of the U shape of the current collector, 4, 4' supports two electrode patterns 1 or 2 having the same polarity;
- a step for bending the current collectors 4, 4' produced (FIG. 6B);
- a step for nesting the same electrically insulating separator 3 into each of the current collectors 4 with positive electrode patterns 1 and into each of the bipolar current collectors 4' with negative electrode patterns 2 (FIG. 6 C). It is specified in this case that, as for the battery A according to the step in FIG. 4 E, it is possible to first arrange the separator 3 in contact with the surface of the negative electrode patterns 2 or 20;
- a step for impregnating the electrode patterns 1, 2 and separator 3 and sealing the electrochemical compartments C5-C6 by depositing adhesive or resin on the peripheral edges thereof which are not fitted with the base of the U shape or bend 42, 42' of a current collector 4 or 4' thus forming seals J. The areas 30 of the separator 3 to be covered with the welding or cladding area are not covered with seals. An electrochemical compartment C5 according to the invention is thus produced (FIG. 6D);
- a step for electrically connecting two identical electrochemical compartments C5 and C6 in series by means of welding or by means of cladding by rolling using an intermediate aluminium sheet 50 as shown in FIG. 6E. It is specified in this case that, as for the step 4/for welding 5 between two adjacent electrochemical compartments C1-C2; C2-C3; C3-C4 described above for the battery A or A1; one of the two compartments C5 is shifted in the vertical direction relative to the other C6 by a sufficient height to position the bends 42, 42' opposite each other so that they are pressed together so as to obtain the material continuity sought.

Figure 6F:
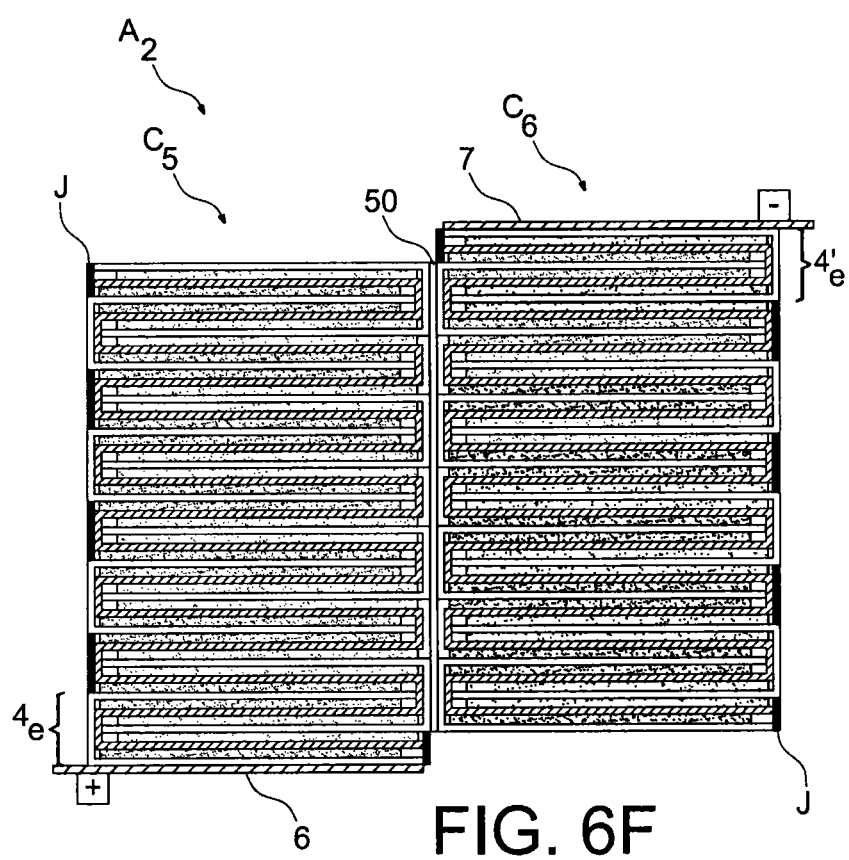

FIG. 6F represents the bipolar battery A2 according to the invention with anode patterns 2, 20 made of $Li_4Ti_5O_{12}$ and cathode patterns 1, 10 made of $LiFePO_4$ and with the positive 6 and negative 7 end current collectors thereof, respectively, in the form of strips welded to the end substrates 4e and 4'e.

In a bipolar Li-ion battery according to the invention, each positive electrode pattern 1 of a given electrochemical compartment C1 to C6 is not in electrical contact with the negative electrode pattern 2 with which it operates electrochemically (Li+ ion insertion/deinsertion).

Figure 7:
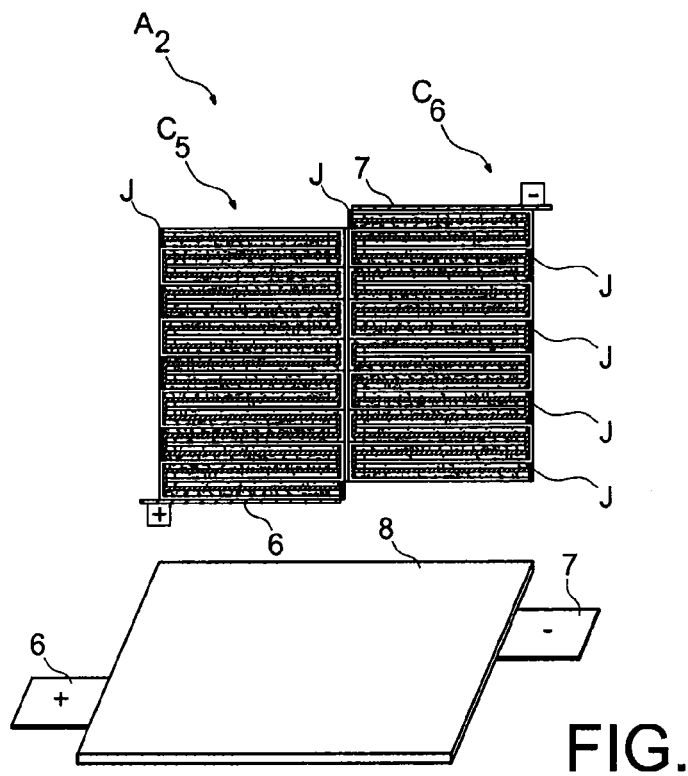
FIG. 7 shows the integration of a bipolar Li-ion electrochemical battery according to the invention in a flexible container.

FIG. 7 represents the bipolar battery A2 according to the invention integrated in a flexible container 8 arranged to contain the compartments C5, C6 tightly while being traversed by a portion of the strips 6, 7 acting as the battery charge poles. A flexible container based on composite materials already commercially available from the companies DNP and Showa Denko and DNP for use as a battery container may be suitable for the invention.

Figure 8:
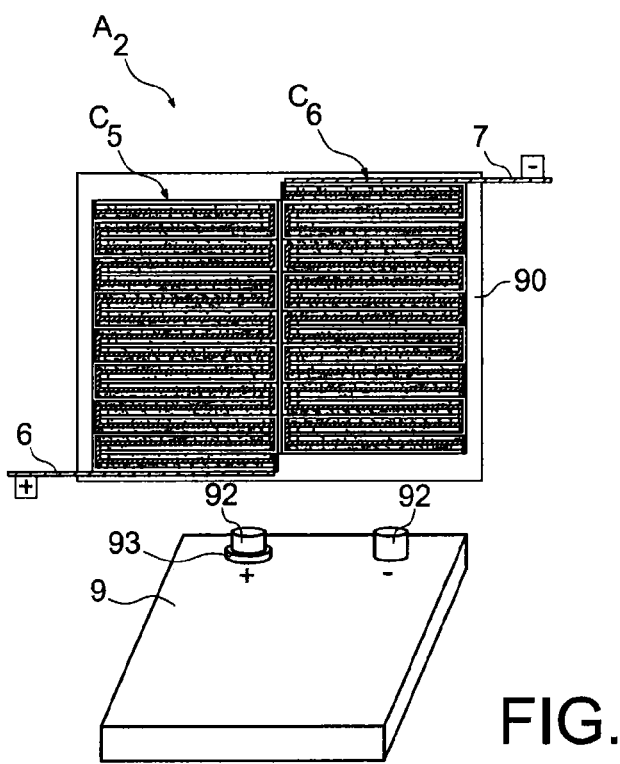
FIG. 8 shows the integration of a bipolar Li-ion electrochemical battery according to the invention in a rigid container.

FIG. 8 represents the bipolar battery A2 according to the invention integrated in a rigid metallic housing 9. In this case, an electrically insulating film 90 covers all the free faces of the two compartments C5 and C6 while being traversed by the strips 6, 7 which are welded to the end substrates 4e, 4'e. In this case, the rigid metallic housing 9 is arranged to contain the compartment coated with the electrically insulating film(s) 90. The strips 6, 7 are each welded to a contact 91, 92 protruding from the metallic housing each acting as one of the battery charge poles. One of the poles 91 is further electrically insulated from the metallic housing 9 by a further electrically insulating seal 93 arranged in an annular manner relative to said contact. A stainless steel or aluminium metallic housing commercially available for use as a battery container may be suitable for the invention.

The invention described herein is suitable for increasing the capacity of a bipolar Li-ion battery significantly while retaining a compact size.

The invention claimed is:

1. A bipolar Li-ion electrochemical battery comprising:
   at least two electrochemical compartments arranged adjacent to each other while being electrically connected in series, each of the compartments comprising:
   at least one first electrically conductive substrate acting as a first current collector comprising two faces, wherein a first face supports an electrode according to at least one pattern and the second face supports an electrode according to two patterns at a mutual distance defining an area devoid of patterns, wherein one of the two patterns of the second face is supported in a same area as the pattern of the first face and the first substrate is bent at the area devoid of patterns to obtain a U shape with one pattern from the first face opposite one pattern from the second face;
   at least one second electrically conductive substrate acting as a second current collector comprising two faces, wherein a first face supports an electrode according to at least one pattern and the second face supports an electrode according to two patterns at a mutual distance defining an area devoid of patterns, wherein one of the two patterns of the second face is supported in a same area as the pattern of the first face and the second substrate is bent at the area devoid of patterns to obtain a U shape with one pattern from the first face opposite one pattern from the second face;

an electrically insulating separator impregnated with an electrolyte and bent according to an accordion shape nested in each of the U shapes of the first and second substrates which are in turn nested in each other, such that the separator impregnated with electrolyte is in contact with each of the electrode patterns;

wherein, for each of the compartments, at least one of the first and second substrates forming the end substrates has a face with precisely one electrode pattern;

wherein, for each of the compartments, the electrode patterns of a same substrate have a same polarity;

wherein, for each of the compartments, the electrode patterns of the second substrate have opposite polarity of those of the electrode of the first substrate;

wherein all the first or second substrates of one of the compartments are in continuous electrical contact with material continuity with all the second or first substrates of another of the adjacent compartments respectively, via the areas thereof devoid of electrode forming the base of the U shapes;

wherein the electrode of the substrates of one compartment, in continuous electrical contact, have opposite polarity of those of the substrates of the other adjacent compartment, in continuous electric contact, thus defining a bipolar current collector;

the battery further comprising an electrically insulating seal arranged on each peripheral edge of each compartment not coated with a substrate or with the continuous electrical contact area with material continuity between substrates, so as to seal the electrolytes and isolate the compartments from ambient air.

2. A bipolar Li-ion electrochemical battery according to claim 1, wherein the electrically insulating seal includes a resin or an adhesive.

3. A bipolar Li-ion electrochemical battery according to claim 1, comprising:
two end current collectors each including a strip, including one connected to the face of an end substrate of one compartment adjacent with one other compartment and comprising a single electrode pattern and the other to the face of an end substrate of the other compartment adjacent with one other compartment and comprising a single electrode pattern, wherein the electrode patterns connected to one of the two strips have opposite polarity to those of the electrode connected to the other strip;
a flexible container configured to contain the compartments tightly while being traversed by a portion of the strips acting as a battery charge pole.

4. A bipolar Li-ion electrochemical battery according to claim 1, comprising:
two end current collectors each including a strip, including one connected to the face of the end substrate of one compartment adjacent with one other compartment and comprising a single electrode pattern and the other to the face of the end substrate of the other compartment adjacent with one other compartment and comprising a single electrode pattern, wherein the electrode patterns connected to one of the two strips have opposite polarity to those of the electrode connected to the other strip;
an electrically insulating film coating free faces of each compartment while being traversed by a portion of the strips;
a rigid metallic container acting as a housing configured to contain the compartments coated by the electrically insulating film, wherein the strips are each connected to a contact protruding from the metallic housing each acting as one of the battery charge poles and one of the poles is electrically insulated from the metallic housing by a further electrically insulating seal arranged in an annular manner relative to the contact.

5. A bipolar Li-ion electrochemical battery according to claim 1, wherein each substrate acting as a current collector is a metallic strip or grid with at least one face covered with a metallic strip.

6. A bipolar Li-ion electrochemical battery according to claim 1, wherein each substrate acting as a current collector is made of aluminum or copper.

7. A bipolar Li-ion electrochemical battery according to claim 1, wherein all the compartments are identical to each other.

8. A bipolar Li-ion electrochemical battery according to claim 1, wherein each separator is a microporous film, or polyolefin, ceramics, or PVDF type polymer.

9. A bipolar Li-ion electrochemical battery according to claim 1, wherein all the negative lithium insertion material-based electrode patterns are based on $Li_4Ti_5O_{12}$ and all the positive lithium insertion material-based electrode patterns are based on $LiFePO_4$.

10. A bipolar Li-ion electrochemical battery according to claim 1, wherein each electrolyte is a carbonated electrolyte containing a lithium salt, or $LiPF_6$.

11. A method for producing a bipolar Li-ion electrochemical battery including at least two electrochemical compartments arranged adjacent to each other while electrically connected in series, the method comprising:
A) for each electrochemical compartment, executing at least once:
a) depositing, on a first face of an electrically conductive substrate acting as a first current collector, at least one electrode pattern and, on a second face of the first substrate opposite the first face, two electrode patterns having a same sign as the pattern of the first face, wherein the two patterns are at a mutual distance defining an area devoid of patterns and one of the two patterns of the second face is deposited in a same area as the pattern of the first face;
b) bending the first electrically conductive substrate substantially into a U shape;
c) implementing a) and b) with a second electrically conductive substrate acting as a second current collector and depositing three electrode patterns having opposite polarity to those deposited on the first substrate; dimensions of the first and second substrates after bending being substantially equal to each other;
d) bending an electrically insulating separator substantially into an accordion shape;
e) nesting the separator after bending into the first and second substrates, each after bending and nesting in each other such that the accordion-shaped separator fits closely to each electrode pattern and peripheral edges of the substrates;
f) producing seals on peripheral edges of the end substrates of the compartment and on one of peripheral edges of the substrates not surrounded by the bent substrates, wherein f) is carried out once the separator has been impregnated with an electrolyte;
B) providing continuous electrical contact with material continuity of all the first or second substrates of one of the compartments with all the second or first of the substrates of another adjacent compartment respectively via the areas thereof devoid of patterns forming the base of the U shapes, wherein the electrode patterns of the substrates of one compartment, in continuous electrical contact, have opposite polarity of those of the substrates of the other adjacent compartment, in continuous electric contact, thus defining a bipolar current collector.

12. A production method according to claim 11, whereby a separator is impregnated with the electrolyte before performing A)-f).

13. A production method according to claim 11, whereby the a) depositing active layers of the electrode patterns on the electrically conductive substrate are performed by coating.

14. A production method according to claim 11, whereby the B) providing the continuous electrical contact is carried out by electric welding or by laser welding.

15. A production method according to claim 14, whereby the B) is carried out using an intermediate metallic sheet between the two current collector substrates placed in continuous electrical contact.

16. A production method according to claim 11, whereby the B) providing the continuous electrical contact is carried out by a metal cladding technique between current collector substrates.

* * * * *